United States Patent [19]

Graser

[11] 3,915,999

[45] Oct. 28, 1975

[54] BLUE ANTHRAQUINOID ACID DYES

[75] Inventor: Fritz Graser, Ludwigshafen, Germany

[73] Assignee: Badische Anilin- & Soda-Fabrik Aktiengesellschaft, Ludwigshafen (Rhine), Germany

[22] Filed: May 14, 1973

[21] Appl. No.: 360,075

[30] Foreign Application Priority Data

May 15, 1972 United Kingdom............... 22616/72

[52] U.S. Cl.................... 260/372; 8/39; 260/239 B; 260/243 B; 260/247.1 A; 260/272; 260/293.62; 260/326.5 SF
[51] Int. Cl............................................. C09b 1/40
[58] Field of Search............ 260/247.1 A, 372, 377, 260/239 B, 272, 293.62, 243 B, 326.5 SF

[56] References Cited
UNITED STATES PATENTS

| | | | |
|---|---|---|---|
| 2,059,476 | 11/1936 | Nawiasky et al..................... | 260/372 |
| 2,100,392 | 11/1937 | Haddock et al. .................. | 260/378 |
| 2,166,353 | 7/1939 | Heslop et al........................ | 260/378 |
| 3,418,342 | 12/1968 | Buecheler..................... | 260/247.1 A |
| 3,491,126 | 1/1970 | Rudolf et al......................... | 260/372 |

OTHER PUBLICATIONS

Trotman, "Dyeing & Chemical Technology of Textile Fibres," (1964) pp. 287, 335, 344–345.
Venkataraman, "Synthetic Dyes," (1952) p. 834.

*Primary Examiner*—Lorraine A. Weinberger
*Assistant Examiner*—Michael Shippen
*Attorney, Agent, or Firm*—Johnston, Keil, Thompson & Shurtleff

[57] ABSTRACT

Anthraquinoid acid dyes of the formula

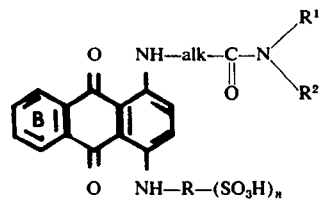

in which alk is a linear or branched alkylene of 1 to 3 carbon atoms, $R^1$ and $R^2$ are hydrogen or alkyl of 1 to 12 carbon atoms or cycloalkyl of 5 to 10 carbon atoms (which may bear alkoxy or alkylthio as a substituent), or the group $-NR^1R^2$ is a five-, six- or seven-membered saturated heterocyclic ring, R is a divalent mononuclear or binuclear aromatic radical in which 1 to 4 hydrogens may be replaced by alkyl, alkoxy or alkylthio of 1 to 4 carbon atoms and/or halogen, and n is one of the integers 1 and 2. The ring B may bear 1 or 2 chlorine atoms or hydroxy groups.

The dyes dye nitrogenous fibers, especially polyamide fibers, clear blue shades having good fastness properties.

5 Claims, No Drawings

BLUE ANTHRAQUINOID ACID DYES

The invention relates to new blue anthraquinoid acid dyes of the 1,4-diaminoanthraquinone series.

The new dyes have the formula (I):

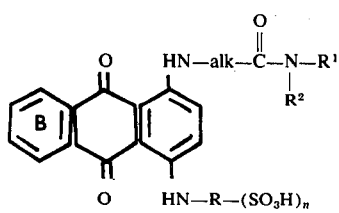
(I)

in which alk is a linear or branched alkylene of one to three carbon atoms, $R^1$ and $R^2$ independently of one another are hydrogen, linear or branched alkyl of 1 to 12 carbon atoms or cycloalkyl of 5 to 10 carbon atoms which may bear alkoxy or alkylthio of 1 to 8 carbon atoms or cycloalkyl as a substituent, or $R^1$ and $R^2$ together with the nitrogen atom of the carboxamido group form a five-membered, six-membered or seven-membered saturated heterocyclic ring which may contain sulfur, nitrogen or oxygen as members of the ring, R is a divalent mononuclear or binuclear uncondensed or condensed aromatic radical which may bear from one to four identical or different substituents of the group of alkyl, alkoxy, alkylthio of one to four carbon atoms and/or halogen, and n is one of the integers 1 and 2 and in which one or two hydrogens in the ring B may be replaced by halogen or hydroxy.

The new acid dyes dye nitrogenous fibers, especially polyamide fibers, clear blue shades of very good fastness properties.

Linear or branched alkylene bridges of from one to three carbon atoms represented by alk may be for example radicals of the formula:

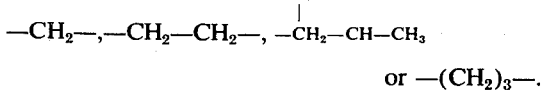

or —(CH$_2$)$_3$—.

The preferred alkylene bridge is —CH$_2$—CH$_2$—.

Particularly suitable examples of $R^1$ and $R^2$, apart from hydrogen, are linear or branched alkyl of 1 to 12 carbon atoms. $R^1$, $R^2$ or $R^1$ and $R^2$ may also be cycloalkyl of 5 to 10 carbon atoms and the cycloalkyl may also bear endomethylene groups. In the alkyl and cycloalkyl 1 or 2 hydrogens may be replaced by alkoxy or alkylthio of one to eight, preferably 1 or 2, carbon atoms.

The following are specific examples of alkyls for $R^1$ and/or $R^2$: methyl, ethyl, n-propyl, isopropyl, n-butyl, isobutyl, 2-ethylhexyl, γ-methoxypropyl, γ-ethoxypropyl, γ-(2-ethylhexoxy)-propyl, β-ethoxyethyl, β-methoxyethyl, decyl, dodecyl or β-cyclohexyl.

Examples of suitable cycloaliphatic radicals for $R^1$ and/or $R^2$ are cyclohexyl, norbornyl, dicyclopentadienyl, cyclopentyl, 4-methylcyclohexyl, 3-methylcyclohexyl, 2-methylcyclohexyl or 4-tertiary-butylcyclohexyl.

Preferred alkyl and/or cycloalkyl radicals for $R^1$ and/or $R^2$ are methyl, ethyl, n-propyl, isopropyl, n-butyl, isobutyl, 2-ethylhexyl, γ-methoxypropyl, γ-ethoxypropyl, γ-(2-ethylhexoxy)-propyl, β-ethoxyethyl, β-methoxyethyl, cyclohexyl, norbornyl and cyclopentyl.

Moreover $R^1$ and $R^2$ together with the nitrogen of the carboxamido group may form a saturated five-membered, six-membered or seven-membered heterocyclic ring which may also contain oxygen, nitrogen, sulfur or

as further ring members. Examples of suitable heterocyclic rings are thiomorpholine-S-dioxide, piperidine, pyrrolidine, morpholine and hexamethylenimine.

Suitable mononuclear or binuclear divalent aromatic radicals whose nuclei may be condensed and which are represented by R are the naphthalene radical, particularly the phenylene radical or radicals of the formula

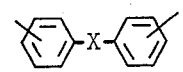

in which X is a direct linkage or

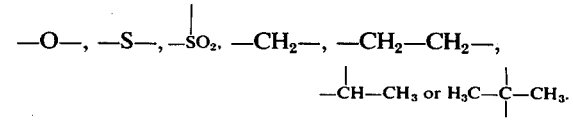

From 1 to 4, preferably from 1 to 3 hydrogens in the aromatic groups may be replaced by alkyl, alkoxy, alkylthio of 1 to 4 carbon atoms and/or halogen such as chlorine, bromine or fluorine.

The divalent radical R may be derived for example from benzene, toluene, xylene, trimethylbenzene, naphthalene, chlorobenzene, anisol, phenetol, diphenyl, diphenyl ether, diphenyl thioether, diphenylmethane or diphenylethane.

The preferred radicals for R are phenylene in which from one to three hydrogens may be replaced by methoxy, methyl, methylthio, fluorine, chlorine and bromine, the substituents being identical or different, and the diphenyl ether radical which may bear chlorine or bromine as a substituent.

Moreover one or two hydrogens in the ring B may be replaced by halogen such as chlorine, bromine or hydroxy. Dyes are preferred however in which the ring B bears hydrogen.

The new acid dyes of the formula (I) may be prepared by sulfonation of a dye of the formula (II):

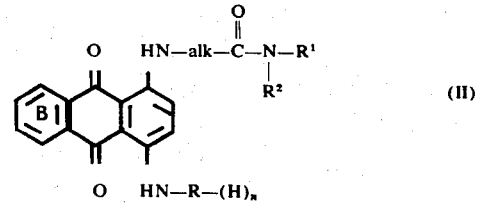
(II)

in which $R^1$, $R^2$, R, n, alk and B have the meanings given above. Compounds of the formula (II) are hereinafter sometimes referred to as dye bases.

Sulfonation is carried out under conventional conditions by a method known per se with concentrated sulfuric acid, 100% by weight sulfuric acid or oleum at a low temperature, e.g. 0° to 5°C, or at ambient temperature up to moderately elevated temperature. In accordance with the present invention moderately elevated temperature means temperatures up to about 70°C.

In cases where R is phenylene only one sulfonic acid group is generally introduced in the sulfonation. When R is naphthylene or a binuclear uncondensed aromatic radical however two sulfonic acid groups can easily be introduced. The sulfonic acids are precipitated from the sulfonation mixture by pouring into water, into ice-water or into a salt solution containing ice. Precipitation of the acid may if necessary be completed by adding sodium chloride or potassium chloride and the acid or mixture of acid and its alkali metal salt may be isolated by a conventional method and dried.

Dye bases of the formula (II), especially those of the formula (II) in which alk is an ethylene bridge, are obtained by adding on an unsaturated compound of the formula (III):

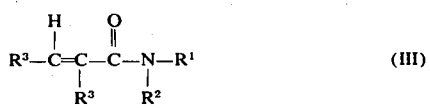
(III)

in which one $R^3$ is methyl and the other is hydrogen or preferably
both radicals $R^3$ are hydrogen and $R^1$ and $R^2$ have the meanings given above to an aminoanthraquinone derivative of the formula (IV):

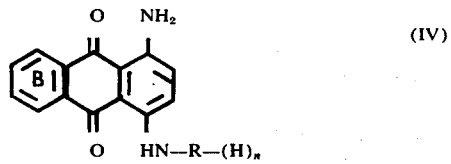
(IV)

in which R, n and B have the meanings given above. The reaction of compound (III) with compound (IV) may be carried out for example by heating the components in an excess of (III) so that the latter serves at the same time as a diluent. The addition of (III) to (IV) is preferably carried out in an inert organic solvent or diluent such as chlorobenzene, xylene, dichlorobenzene, methylnaphthalene in the presence of a more or less large amount of a catalyst at a temperature of from 50° to 200°C, preferably at from 100° to 180°C. Organic sulfonic acids such as o-toluenesulfonic acid, p-toluenesulfonic acid, benzenesulfonic acid or naphthalenesulfonic acid are particularly suitable as catalysts. Addition of (III) to (IV) may also be carried out in moderately concentrated mineral acids, such as 50 to 75% by weight sulfuric acid, at room temperature up to 100°C, preferably at from 30° to 70°C.

The following compounds of the formula (III) are examples of those which will add on to aminoanthraquinone derivatives (IV): methacrylic N,N-dimethylamide, crotonic N,N-dimethylamide, acrylic N-2-methylcyclohexylamide, acrylic N-3-methylcyclohexylamide, acrylic N-β-cyclohexylethylamide, acrylic N-4-tert.-butylcyclohexylamide, preferably acrylic acid derivatives such as acrylic N,N-dimethylamide, acrylic N-n-propylamide, acrylic N,N-diisopropylamide, acrylic N,N-di-n-propylamide, acrylic N,N-di-n-butylamide, acrylic N,N-diisobutylamide, acrylic N-cyclohexylamide, acrylic-N-norbornylamide, acrylic N-dicyclopentadienylamide, acrylic N-methyl-N-cyclohexylamide, acrylic N-γ-methoxypropylamide, acrylic piperidide, acrylic pyrrolidide and acrylic morpholide. The production of these compounds is known or known per se. The compounds are conveniently obtained from the carboxylic acid chloride of the unsaturated carboxylic acid in an inert solvent such as benzene or toluene at low temperature, for example at from 0° to 10°C and the corresponding amine of the formula:

(VII)

The dye bases of the formula (III) may also be prepared from a compound of the formula (V):

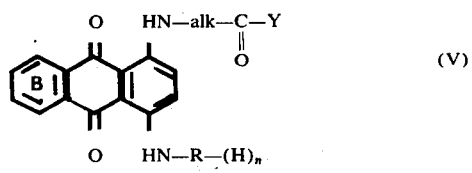
(V)

in which Y is a group which can be exchanged by the amine radical

for example chlorine or a lower alkoxy such as ethoxy, propoxy or methoxy, by reaction with an amine of the formula (VII). Compounds of the formula (V) in which Y is a halogen, for example chlorine, are obtained from the appropriate carboxylic acids (V) (Y = OH) by a conventional method in an inert organic solvent by means of a halogenating agent such as thionyl chloride or phosphorus trichloride. The further reaction of the amine of the formula (VII) may be carried out in conventional manner in an inert organic solvent or in a large excess of the amine which thus serves at the same time as solvent and diluent.

Amidation is preferably effected with a compound of the formula (V) in which Y is a lower alkoxy. The reaction of a compound of the formula (V) with the amine of the formula (VII) is advantageously carried out in a large excess of the amine as solvent, if necessary in the presence of a small amount of an ammonium salt, for example of the same amine with a mineral acid such as hydrochloric acid. To accelerate the reaction it is advantageous to heat to a temperature of from 100°C to the boiling point of the amine, for example to 200°C, or if amines of lower boiling point are used at superatmospheric pressure if necessary. The compounds of the formula (II) may also be obtained from aminoanthraquinone derivatives of the general formula (VI):

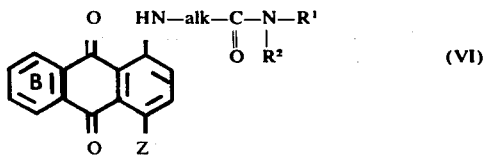
(VI)

in which Z is a group, such as halogen, which can be exchanged by an amino group, by reaction with an aromatic amine of the formula:

$H_2N-R-H$ (VIII)

in which R has the meanings given above.

Examples of compounds (VIII) which may be used are aromatic amines in which from 1 to 4 hydrogens may be replaced by alkyl, alkoxy, alkylthio of 1 to 4 carbon atoms or halogen, the substituents being identical or different. Specific examples are aniline, mesidine, chloroaniline, toluidine, anisidine, phenetidine, aminodiphenyl, aminodiphenyl ether, naphthylamine or aminodiphenylmethane.

Reaction of the aminoanthraquinone derivative (VI) with the amine (VIII) is advantageously carried out in a large excess of the amine, which thus serves at the same time as a solvent and diluent. The reaction is preferably carried out in the presence of an agent having an alkaline reaction, such as an alkali metal carbonate, alkali metal bicarbonate, tertiary amine, and of a catalyst such as copper powder, a copper oxide or a copper salt.

Compounds of the formula (I) may also be obtained by reaction of a compound of the formula (IX):

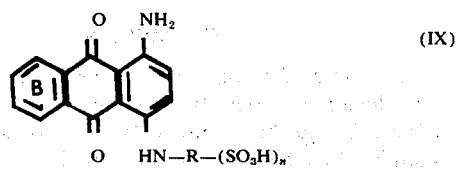

with a compound (III) under the same conditions as in the reaction of (IV) with (III). Another method consists in the reaction of a compound of the formula (X):

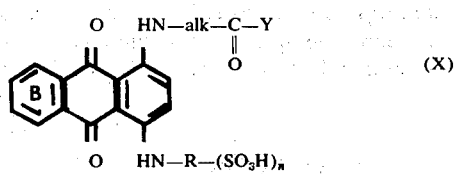

with an amine of the formula (VII) under the same conditions as the reaction of (V) with the said amines (VII). R, alk, Y, $R^1$, $R^2$ and $n$ in the formula have the meanings given above.

For industrial reasons dyes of the formula (Ia):

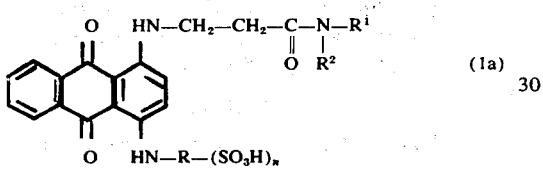

in which $R^1$, $R^2$, n and R have the meanings given above are of special interest.

The dyes of the formula (I) may be used both in the form of the free acids and in the form of their water-soluble salts. The new acid dyes give dyeings or prints in clear blue shades on nitrogenous fibers, particularly on polyamide. The dyeings or prints obtained on polyamide are distinguished by very good light fastness and good wet fastness. The dyes exhibit a very good tinctorial behavior when used from a bath. The tinctorial properties of the dyes (I) may be influenced by appropriate selection of R and the grouping $-NR^1R^2$.

The dyes may also be used mixed with one another and in admixture with other dyes.

The following Examples illustrate the invention. Parts and percentages are by weight.

EXAMPLE 1

30 parts of 1-amino-4-(4'-methylphenylamino)-anthraquinone, 75 parts of anhydrous o-dichlorobenzene and 20 parts of p-toluenesulfonic acid are heated to 100°C. 30 parts of acrylic N,N-dimethylamide is added within twenty minutes at 100°C to 110°C and the whole is kept at 100° to 110°C until starting material can no longer be detected chromatographically. This is the case after about 90 minutes to 2 hours. The whole is diluted with ethanol, allowed to cool, and filtered. The filter residue is washed with ethanol and water and dried. A good yield is obtained of a compound of the formula:

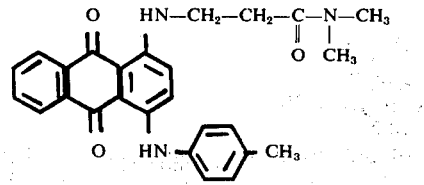

Analysis: $C_{26}H_{25}O_3N_3$. found C 72.5 H 5.7 O 11.9 N 9.7. calculated: 73.0 5.9 11.2 9.8.

EXAMPLE 2

9 parts of the compound obtained according to Example 1 is introduced at 20° to 25°C into 60 parts of oleum ($SO_3$ content: 8%). The whole is stirred at 20° to 25°C until a sample dissolves completely in hot water if necessary in the presence of a small amount of ammonia. This is the case after about 3 hours. The reaction mixture is then poured into an ice-cold concentrated potassium chloride solution and the precipitate formed is filtered off. The filter residue is stirred with 10% aqueous potassium chloride solution, made neutral with aqueous potassium hydroxide solution, filtered and dried. A dye of the formula:

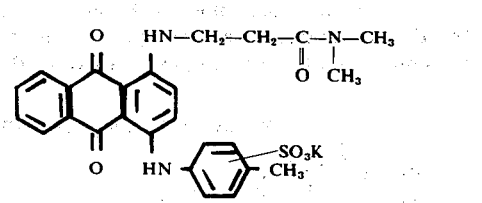

is obtained in a very good yield. The dye dyes polyamide clear blue shades having very good light fastness and good levelling power.

EXAMPLE 3

The procedure as described in Example 1 is followed but 32.8 parts of 1-amino-4-(4'-anisidino)-anthraquinone is used instead of 30 parts of 1-amino-(4'-methylphenylamino)-anthraquinone. A compound of the formula:

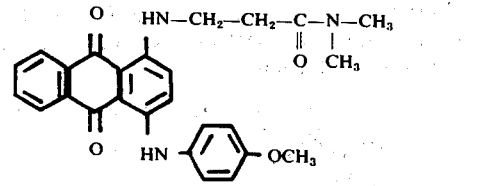

is obtained in a good yield.

EXAMPLE 4

12 parts of the compound obtained according to Example 3 is introduced at 0° to 5°C into 60 parts of oleum ($SO_3$-content: 8%) and stirred at 0° to 5°C until a processed sample dissolves completely in hot water to which a small amount of ammonia has been added. This is the case after about 3 hours. The mixture is poured into ice-cold concentrated potassium chloride solution and the precipitate is filtered off. The filter cake is stirred with water, the suspension or solution is made neutral with dilute potassium hydroxide solution and the dye is precipitated by adding a little potassium chloride. The precipitate is filtered off and dried. A dye of the formula:

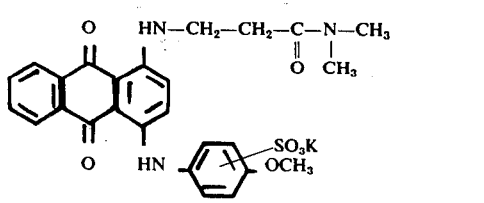

is obtained which dyes polyamide clear blue shades having very good light fastness.

EXAMPLE 5

The procedure described in Example 1 is followed but the same amount (30 parts) of acrylic N-n-propylamide is used instead of acrylic N,N-dimethylamide. A good yield of a compound of the formula:

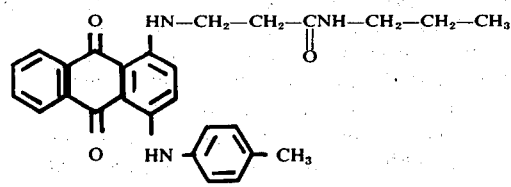

is obtained.

EXAMPLE 6

The procedure described in Example 4 is followed but the compound from Example 5 is used instead of the compound from Example 3. A dye of the formula

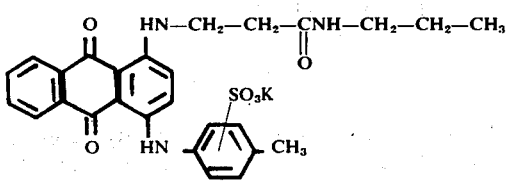

is obtained in a very good yield. It dyes polyamide clear blue shades of very good light fastness.

EXAMPLE 7

The procedure described in Example 1 is followed but 30 parts of acrylic cyclohexylamide is used instead of acrylic N,N-dimethylamide and dissolved in 60 parts of anhydrous o-dichlorobenzene. The whole is kept for ninety minutes at 100° to 110°C. A good yield of a compound of the formula:

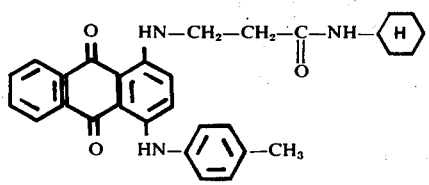

is obtained.

EXAMPLE 8

16.1 parts of the compound of the formula

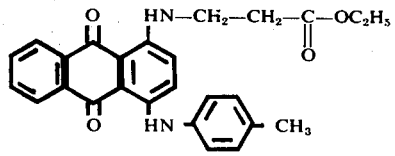

is heated with 80 parts of cyclohexylamine to about 134° to 135°C and kept at this temperature for ten hours while distilling off ethanol. After 1 part of 25% hydrochloric acid has been added the whole is kept at this temperature for another ninety minutes, diluted with ethanol and worked up. A compound is obtained in a good yield which is identical with the compound of Example 7.

EXAMPLE 9

12 parts of the compound obtained in Example 7 is introduced into 60 parts of oleum ($SO_3$-content: 8%) at 0° to 5°C and the whole is stirred at 0° to 5°C until a sample which has been worked up dissolves completely in hot water with the addition of a little ammonia. This is the case after about 2 hours. The reaction mixture is poured onto a mixture of ice and water, filtered, the filtered material is stirred with water, the resultant suspension is neutralized with dilute caustic soda solution, filtered and dried. A good yield of a dye of the formula:

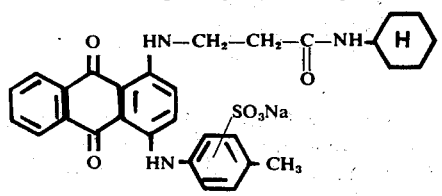

is obtained which dyes polyamide clear blue shades of very good light fastness and good wet fastness.

A similar result is obtained when the dye prepared according to Example 8 is used.

EXAMPLE 10

16.1 parts of the compound of the formula:

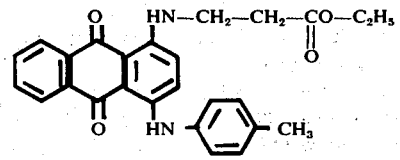

and 80 parts of 2-ethylhexylamine are kept for four hours at 145° to 150°C while distilling off ethanol and then stirred for 7 hours at 165° to 170°C. 1 part of 25% hydrochloric acid is added and the whole is heated for 90 minutes at 165° to 170°C. After cooling, the excess of amine is distilled off with steam. After pouring into water, the distillation residue is stirred with ethanol, filtered, washed and dried. A compound of the formula:

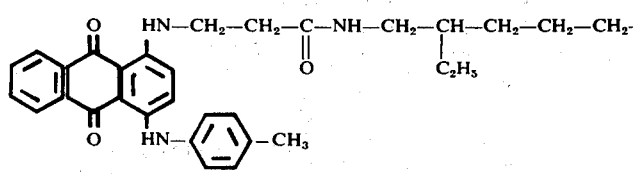

is obtained.

EXAMPLE 11

The procedure described in Example 9 is followed but an equal amount of the compound obtained according to Example 10 is used instead of the compound obtained according to Example 7. A very good yield of a dye of the formula:

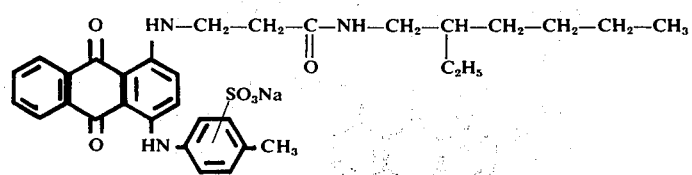

is obtained which dyes polyamide clear blue shades of very good fastness to light and good fastness to perspiration.

EXAMPLE 12

32.8 parts of 1-amino-4-(4'-methylphenylamino)-anthraquinone, 75 parts of anhydrous o-dichlorobenzene and 20 parts of p-toluenesulfonic acid are heated to 100° to 110°C and 30 parts of acrylic piperidide is added in three portions over 20 minutes. The whole is kept at 100° to 110°C for about another 2 hours until reaction has been completed. The solvent is then distilled off with steam and the distillation residue is triturated with water, filtered, washed and dried. A very good yield of a compound of the formula:

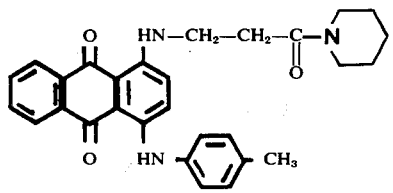

is obtained.

EXAMPLE 13

15 parts of the compound obtained according to Example 12 is introduced at 0° to 5°C into 75 parts of oleum ($SO_3$-content: 8%) and stirred at 0° to 5°C until a sample withdrawn and worked up dissolves completely in hot water to which a little ammonia has been added. This is the case after about 2 hours. The whole is poured into an ice-cold concentrated potassium chloride solution, filtered, the filtered material is stirred with water, made neutral with dilute potassium hydroxide solution, salted out with potassium chloride, filtered and dried. A very good yield of a dye of the formula:

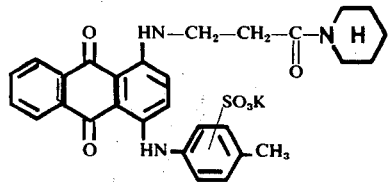

is obtained which dyes polyamide clear blue shades of very good light fastness and good wet fastness.

EXAMPLE 14

The procedure described in Example 12 is followed but the same amount of acrylic morpholide is used instead of acrylic piperidide. A very good yield of a compound of the formula:

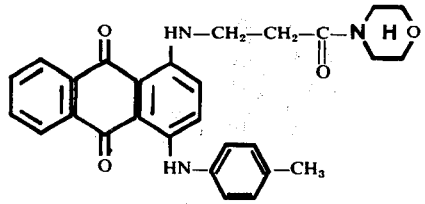

is obtained.

EXAMPLE 15

The procedure described in Example 13 is followed but the compound of Example 14 is used instead of that of Example 12. A good yield of a dye of the formula:

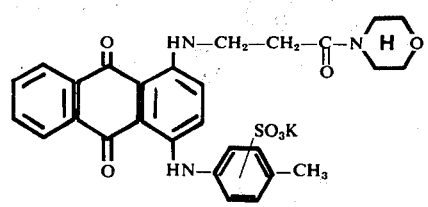

is obtained which dyes polyamide clear blue shades of very good light fastness and good wet fastness.

EXAMPLES 16 to 28

30 parts of the aminoanthraquinone compound A is reacted with the acrylamide B in accordance with the description in Example 1 or 12 in o-dichlorobenzene in the presence of p-toluenesulfonic acid, the dye bases of formula (II) obtained being shown under C in Table I.

TABLE I

EXAMPLE 16

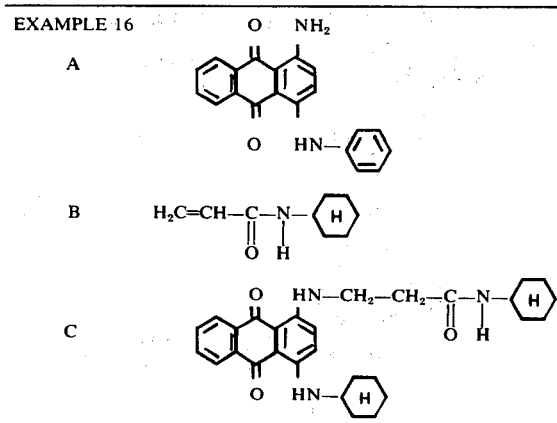

EXAMPLE 17

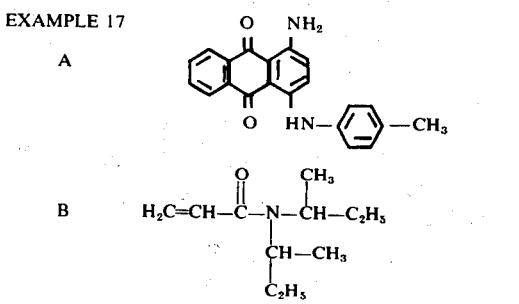

TABLE I-continued
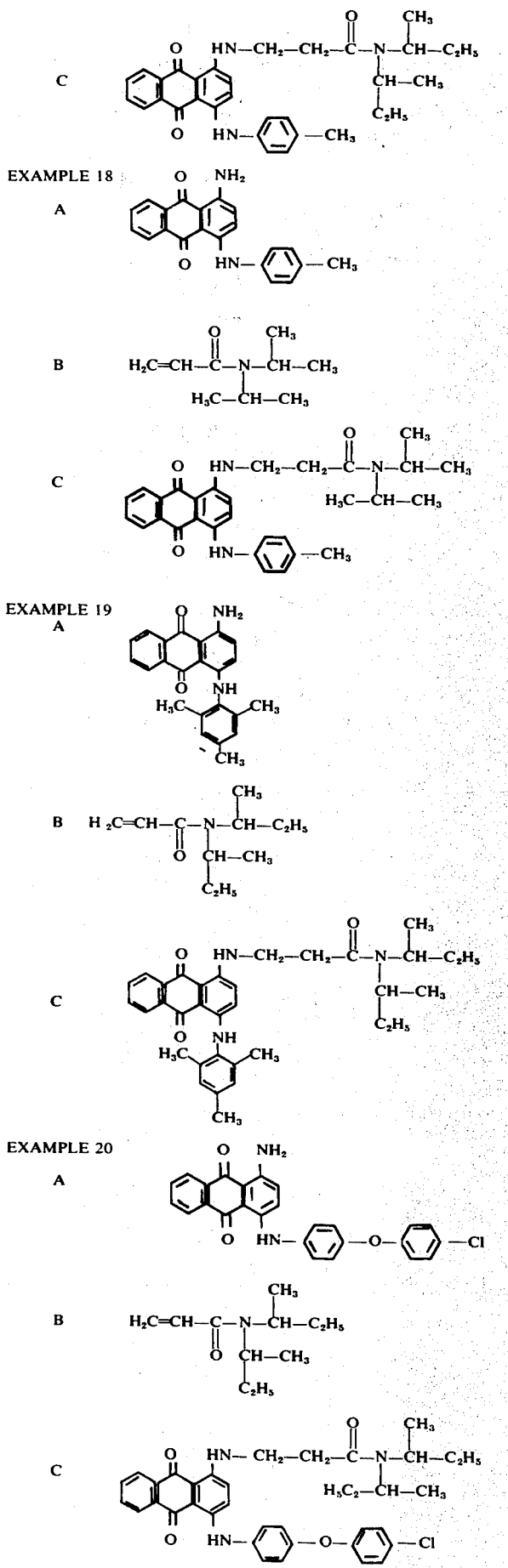
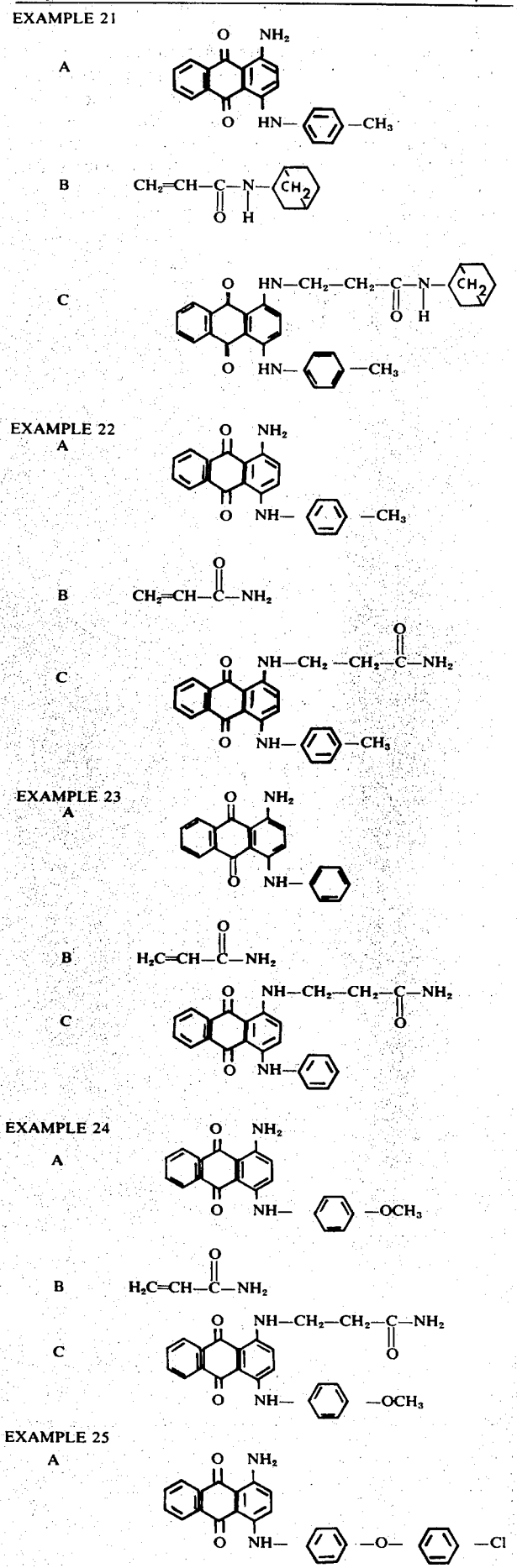

TABLE I-continued
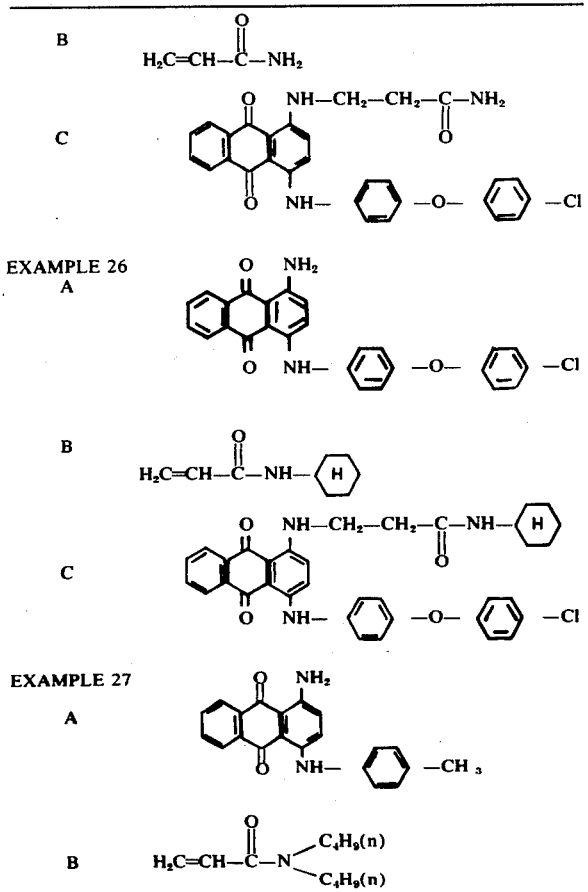
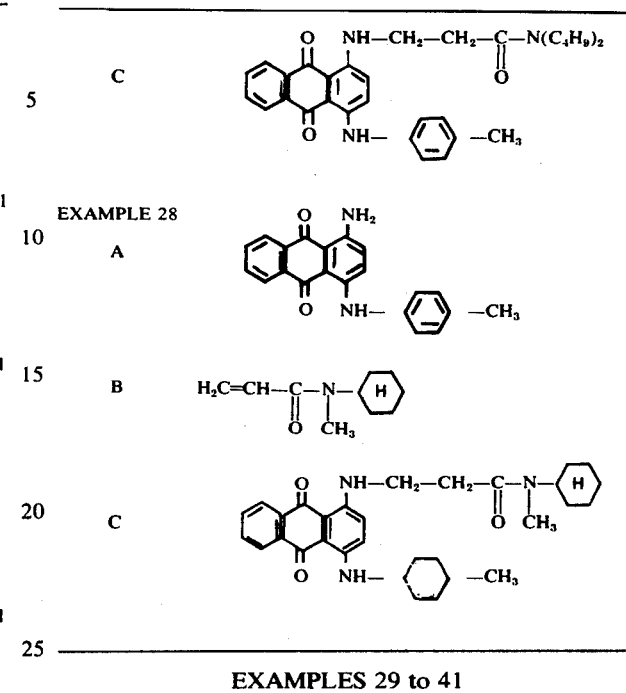
EXAMPLES 29 to 41
The compounds obtained according to Examples 16 to 28 are sulfonated and processed as described in Examples 2, 4, 9 or 13. From the dye bases specified in the following Table II the corresponding dyes of formula (I) are obtained:
| EXAMPLE | Dye base from Example | Dye |
|---|---|---|
| 29 | 17 | (structure) |
| 30 | 16 | (structure) |
| 31 | 18 | (structure) |
| 32 | 19 | (structure) |

-continued
| EXAMPLE | Dye base from Example | Dye |
|---|---|---|
| 33 | 20 | 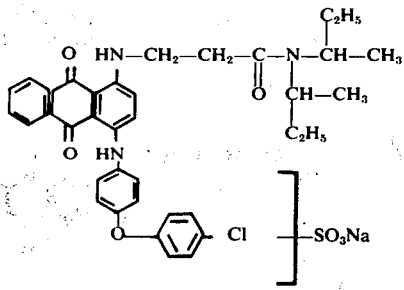 |
| 34 | 21 |  |
| 35 | 22 | 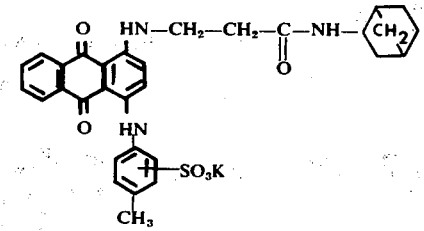 |
| 36 | 23 |  |
| 37 | 24 | 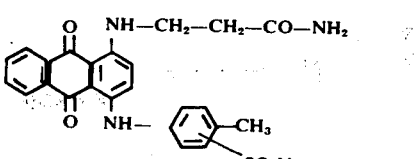 |
| 38 | 25 |     $n \approx 2$ |
| 39 | 26 | 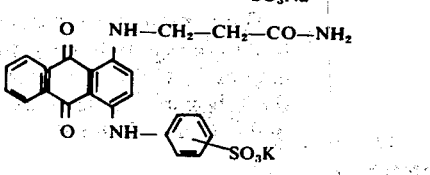    $n \approx 2$ |
| 40 | 27 |  |

| EXAMPLE | Dye base from Example | Dye |
|---------|----------------------|-----|
| 41 | 28 | 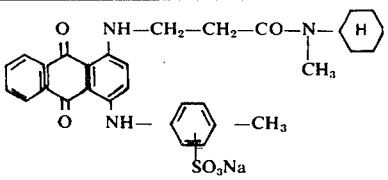 |

EXAMPLE 42

15 parts of the compound

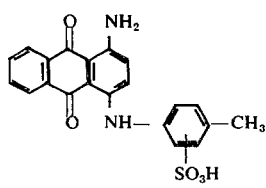

which has been obtained by sulfonation of 1-amino-4-(4'-toluidino)-anthraquinone, is introduced into 38 parts of o-dichlorobenzene and then, in the presence of 10 parts of p-toluenesulfonic acid, 25 parts of N,N-dimethylacrylamide is added at 100° to 110°C in the course of two hours and the whole is kept at this temperature until starting compound can no longer be detected. The reaction mixture is then freed from solvent with steam, and 10% potassium chloride solution is added to the aqueous residue. The precipitate is filtered off and washed with 10% potassium chloride solution. The dye obtained is reprecipitated from water by adding potassium chloride and purified in this way. The dye dyes polyamide fibers blue shades which are similar to those obtained with the dye of Example 2.

I claim:

1. A blue anthraquinoid acid dye of the formula

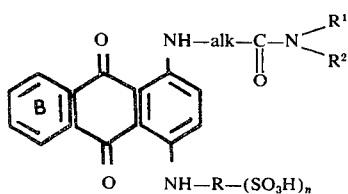

in which:

alk is alkylene of 1 to 3 carbon atoms;

each of $R^1$ and $R^2$ is hydrogen, alkyl of 1 to 12 carbon atoms, cycloalkyl of 5 to 10 carbon atoms, said alkyl and cycloalkyl substituted once by alkoxy or alkylthio of one to eight carbon atoms each or said cycloalkyl substituted by endomethylene, or $R^1$ and $R^2$ together with the nitrogen atom of the carboxamido group form the thiomorpholine-S-dioxide, piperidine, pyrrolidine, morpholine or hexamethylenimine ring;

R is divalent phenylene or naphthylene which is unsubstituted or substituted once to four times by a member selected from the group consisting of alkyl, alkoxy or alkylthio of 1 to 4 carbon atoms each and halogen;

n denotes one of the integers 1 and 2; and the B ring is unsubstituted or substituted once or twice by halogen or hydroxy.

2. A dye as claimed in claim 1 in which R is phenylene or naphthylene which is unsubstituted or substituted once to four times by a member selected from the group consisting of methyl, methoxy, methylthio, chlorine, fluorine and bromine.

3. A dye of the formula

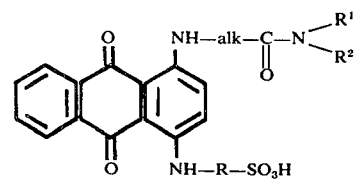

in which:

alk is $-CH_2-CH_2-$;

each of $R^1$ and $R^2$ is hydrogen, alkyl of one to twelve carbon atoms, cycloalkyl of five to ten carbon atoms, said alkyl and cycloalkyl substituted once by methyl, ethyl, methoxy or ethoxy or said cycloalkyl substituted by endomethylene; and R is phenylene substituted once to three times by a substituent selected from the group consisting of methyl, methoxy, methylthio, chlorine, bromine and fluorine.

4. A dye as claimed in claim 3 in which:

each of $R^1$ and $R^2$ is selected from the group consisting of hydrogen, methyl, ethyl, n-propyl, isopropyl, n-butyl, isobutyl, 2-ethylhexyl, γ-methoxypropyl, γ-ethoxypropyl, γ-(2-ethylhexoxy)-propyl, β-methoxyethyl, β-ethoxyethyl, cyclohexyl, cyclopentyl and norbornyl, or $R^1$ and $R^2$ together with the nitrogen atom of the carboxyamide group form N-piperidinyl, N-pyrrolidinyl, N-morpholinyl or N-hexamethylenimino; and R is the divalent radical of benzene, toluene, xylene, trimethylbenzene, anisol, phenetol or chlorobenzene.

5. A dye of the formula

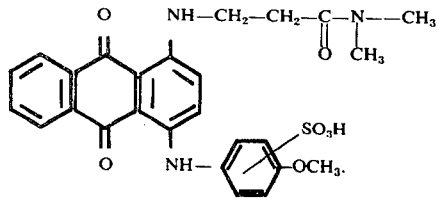

* * * * *

UNITED STATES PATENT AND TRADEMARK OFFICE
CERTIFICATE OF CORRECTION

PATENT NO. : 3,915,999
DATED : October 28, 1975
INVENTOR(S) : GRASER

It is certified that error appears in the above-identified patent and that said Letters Patent are hereby corrected as shown below:

In Column 1, Line 42, delete " $-CH_2-,-CH_2-CH_2-,-CH_2-CH-CH_3$ " and substitute -- $-CH_2-,-CH_2-CH_2-,-CH_2-CH-CH_3$ --

In Column 6, Lines 1 & 2, delete " Analysis: $C_{26}H_{25}O_3N_3$. found C 72.5 H 5.7 O 11.9 N 9.7. calculated 73.0 5.9 11.2 9.8. " and substitute -- Analysis: $C_{26}H_{25}O_3N_3$ -- found          C 72.5     H 5.7     O 11.9     N 9.7 calculated:     73.0        5.9       11.2       9.8

In Column 9, the structural formula for Example 12 should read -- ... $-\underset{\underset{O}{\|}}{C}-N\langle H\rangle$ --

Signed and Sealed this

Fourteenth Day of September 1976

[SEAL]

Attest:

RUTH C. MASON
*Attesting Officer*

C. MARSHALL DANN
*Commissioner of Patents and Trademarks*